No. 741,732. PATENTED OCT. 20, 1903.
A. W. SOUTHEY.
DEVICE FOR MEASURING FLUIDS.
APPLICATION FILED FEB. 17, 1903.
NO MODEL.
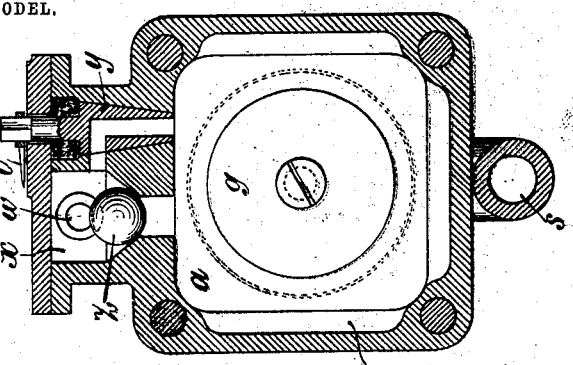
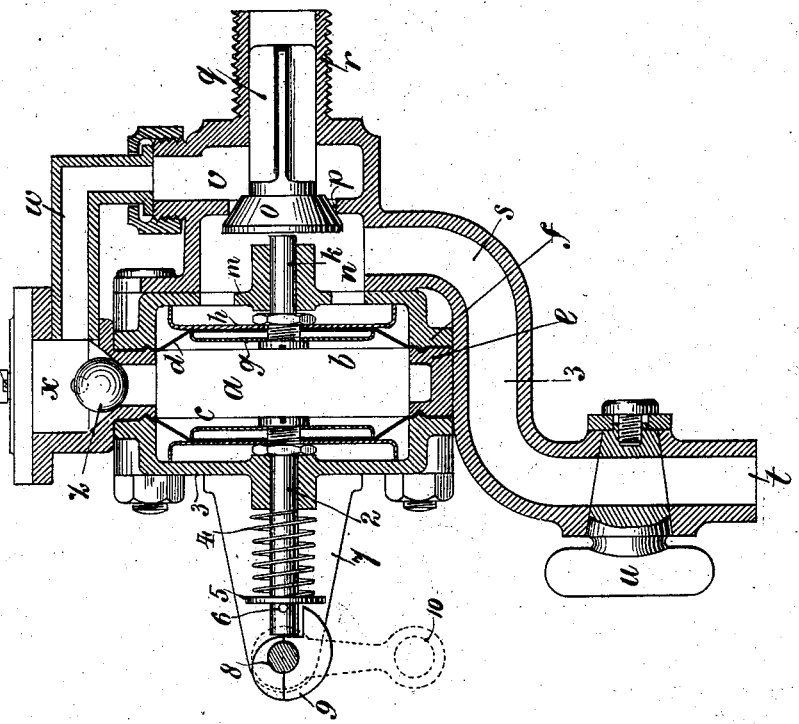
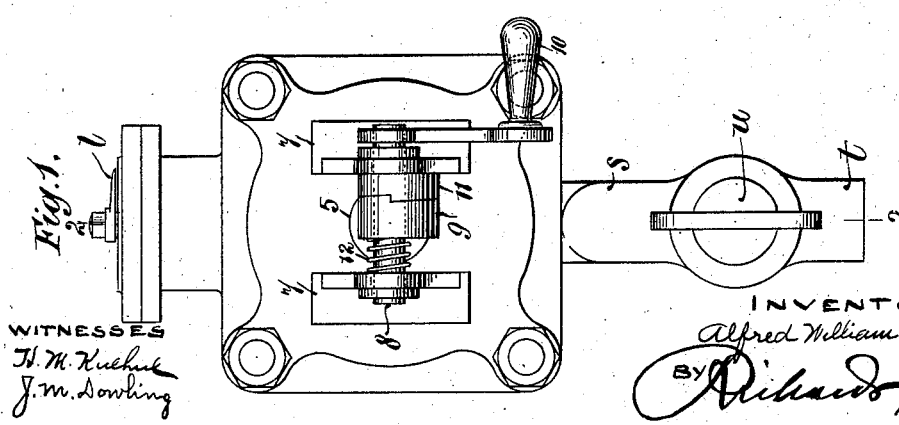
WITNESSES
INVENTOR
Alfred William Southey
BY
ATTORNEYS No. 741,732. Patented October 20, 1903.

UNITED STATES PATENT OFFICE.

ALFRED WILLIAM SOUTHEY, OF LONDON, ENGLAND.

DEVICE FOR MEASURING FLUIDS.

SPECIFICATION forming part of Letters Patent No. 741,732, dated October 20, 1903.

Application filed February 17, 1903. Serial No. 143,820. (No model.)

*To all whom it may concern:*

Be it known that I, ALFRED WILLIAM SOUTHEY, engineer, of No. 16 Elm street, Gray's Inn road, London, England, have invented a certain new and useful Improved Device for Measuring Fluids; and I do hereby declare the following to be a full, clear, and exact description of the invention, such as will enable others skilled in the art to which it appertains to make and use the same.

This invention relates to a device whereby fluid can be delivered directly from a quantity in bulk in desired volumes with great accuracy without first entering a measuring vessel, the device providing an automatic cut-off when the desired quantity has been delivered and being adapted to enable the volume of delivery to be modified at will. It is further adapted to enable the defined quantity to be drawn off in instalments.

The principle of operation may be thus stated: A chamber is provided of comparatively small capacity fitted with a moving diaphragm, which is adapted to vary the capacity of the chamber from a definite minimum to a definite maximum. This chamber is in communication with a reservoir of fluid through a channel which is commanded by a turn-cock or valve, which is adapted to throttle the passage to a degree which can be accurately adjusted. On the reservoir side of this channel of communication a valve is fitted, through which when opened the fluid can escape to a discharging mouthpiece. On the mouthpiece side of this escape-valve there is a free passage leading to the space on the side of the moving diaphragm away from the before-mentioned chamber. The parts are so adapted that when the chamber is full to its maximum the diaphragm presses on the escape-valve and closes it by virtue of its larger area.

To put the measuring device into operation, the throttle-valve is suitably adjusted, a free passage being left when a small delivery is required and a constricted passage when the quantity wanted is large. The volume of the chamber is then reduced to a minimum by some external agency. The effect is to relieve the closing force on the valve, which forthwith opens under the action of the fluid-pressure, and the fluid simultaneously commences to flow from the same passage into the chamber and into the channel leading to the discharge-orifice, the opposing pressure on the diaphragm being the same as that on the exit side of the escape-valve. The valve will remain open for the length of time which under the circumstances will be occupied in filling the chamber to its maximum, and then the escape-valve will be closed. By such means the quantity delivered may be identically repeated however the head in the reservoir may vary, and by altering the degree of throttling the volume delivered in any one operation may be adjusted to be any multiple of the volume of the chamber or even any fraction of that volume. For this reason the chamber will henceforth be referred to as the "ratio-chamber."

If only a portion of the quantity which the apparatus is set to deliver is wanted at one time, the closing of the stop-cock in the delivery-pipe will suspend the flow of the fluid both to the ratio-chamber and to the discharging mouthpiece. The pressure on the diaphragm will in the interim remain balanced, causing it to stop, and its movement will be resumed on reopening the stop-cock. Thus the complete volume can be withdrawn in instalments.

On the accompanying drawings is shown a method of construction whereby the operation just described may be practically achieved.

In the drawings, Figure 1 is a front view of the apparatus. Fig. 2 is a section along 2 2 of Fig. 1, and Fig. 3 is a section along 3 3 of Fig. 2.

In the views, *a* is the ratio-chamber, which is shown fitted with two moving diaphragms *b* and *c*, of which the one, *b*, is that to which previous reference has been made. The purpose of the other will be presently explained. The diaphragm consists of an elastic membrane *d*, the edges of which are secured between the flange-surfaces *e* and *f* of the two portions of the chamber *a*. The central portion of the diaphragm is inclosed between the plates *g* and *h*, which by means of a screw and its nut are pinched together. The shank *k* of this screw is guided in a central orifice in a plate *m*, the perforations of which place the right-hand side of the diaphragm *b* in communication with the space $n$. In the extreme position of the diaphragm, as shown, the shank $k$ butts against a valve $o$ and forces it against its seat $p$. When the diaphragm $b$ is withdrawn from the position shown, the valve $o$ will open to an extent limited by its abutment against the boss of the plate $m$. The valve is supported by feather-guides $q$, which fit within a pipe $r$, connected with a reservoir of fluid.

$s$ is a discharge-pipe leading from the space $n$ outside the valve $o$ to the mouthpiece $t$, a stop-cock $u$ being interposed.

The end of the pipe $r$ opens into an enlargement $v$, from which when the valve $o$ and stop-cock $u$ are open fluid can escape. This enlargement also communicates by a pipe $w$ with a valve-chest $x$, containing a turn-cock $y$ and a one-way valve $z$. By turning the plug of the turn-cock $y$ into a suitable position the width of the passage from the valve-chest $x$ to the ratio-chamber $a$ can be constricted to any required degree, the amount of which is indicated by a pointer 1 on a graduated disk. The valve $z$ will permit the free escape of fluid from the ratio-chamber, but precludes the passage of fluid in the opposite direction.

The left-hand diaphragm $c$ is fitted like $b$, and the shank 2 of its screw projects through and is guided in the central orifice of the cover 3 of the ratio-chamber. On the shank is threaded the helical spring 4 and the washer 5, a pin 6 penetrating the shank and securing them in place. The spring will thus cause the diaphragm to be urged to the extreme left-hand position.

Mounted in a bracket 7 on the cover is a spindle 8, on which is mounted a cam 9 and to which is secured the handle 10 and clutch-piece 11. If the handle as viewed in Fig. 2 is turned clockwise, the clutch effects the rotation of the cam, and this is so shaped as to force the shank 2 and the diaphragm $c$ to the right and squeeze out of the ratio-chamber the fluid which it contains. This will flow to a small extent through the constricted passage in the turn-cock $y$, but chiefly by lifting the valve $z$ will be returned to the supply-pipe $r$ by way of its enlargement $v$. After a complete rotation of the handle and cam a radial portion will come opposite the shank 2, and the pressure on it will be suddenly released, permitting the spring 4 to effect the immediate return movement of the diaphragm $c$. There will be an immediate relief of pressure in the ratio-chamber, and the diaphragm $b$ will follow the diaphragm $c$ and permit the valve $o$ to open. Supposing the stop-cock $u$ is at this time open, the fluid will pour out of $t$, passing through the valve $o$ first into the space $n$, this being in communication with the back surface of the diaphragm $b$. The same fluid-pressure will oppose its return movement as will oppose the escape of the fluid through the open valve $o$. In consequence of the larger pressure in $v$ than in $n$ the ratio-chamber will gradually fill through the constricted passage in the turn-cock $y$. Starting at the same time fluid will flow through the valve $o$ into the open, and the quantity which will be able to escape during the filling of the chamber may be caused to be any multiple of the volume of the ratio-chamber, the magnitude of which will depend on the setting of the turn-cock $y$. When the ratio-chamber has been completely filled, the valve $o$ will be again forced onto its seat and the discharge will cease.

If the handle 10 is turned anticlockwise, the clutch 11 presses the cam 9 sidewise against the force of a helical spring 12, and the cam is not rotated. The object of the cam and spring device is to discharge the contents of the ratio-chamber to a defined amount and then open the valve $o$ and start the refilling of the chamber simultaneously and abruptly.

If when the fluid is escaping through the mouthpiece $t$ the stop-cock is closed, the pressure in the pipe $s$ and space $n$ will immediately rise to equal that in the enlargement $v$ and ratio-chamber $a$, whereupon the movement of the diaphragm $b$ will be suspended, the movement being resumed on the reopening of the stop-cock $u$. Thus the defined quantity can be drawn off in instalments as required. To insure additional accuracy when the multiple adopted is a very large one, all movement of the diaphragm due to a possible extraneous cause may be precluded by the simultaneous closing of a stop-cock in the pipe $w$.

When the quantity to be delivered is small, it may be adjusted in an alternative way by modifying the quantity of fluid which is expressed out of the ratio-chamber antecedent to the release of the diaphragm $c$.

I claim—

1. A device for measuring fluids comprising a chamber, a movable diaphragm therein, a source of supply, a passage connecting the source of supply with the chamber, means for constricting the passage, a discharge-mouth, a passage from the source to the discharge-mouth and an automatically-operated valve for controlling the said passage, substantially as described.

2. A device for measuring fluids comprising a chamber, a movable diaphragm therein, a source of supply, a passage connecting the source of supply with the chamber, means for constricting the passage, a discharge-mouth, a passage from the source of supply to the discharge-mouth, a valve controlling the said passage, said valve being operated by the movement of the said diaphragm, and means for moving the diaphragm, substantially as described.

3. A device for measuring fluids comprising a chamber, a movable diaphragm therein, a source of supply, a passage connecting the source of supply with the chamber, means for constricting the passage comprising a turn-cock therein, a one-way valve, a discharge-mouth, a passage from the source of supply to the discharge-mouth, a valve controlling the said passage, the said valve being operated by the movement of the diaphragm, and means for moving the diaphragm, substantially as described.

4. A device for measuring fluids comprising a chamber, a movable diaphragm therein, a source of supply, a second chamber adapted to receive the fluid from the source, a passage leading from the said second chamber to the first-mentioned chamber, means for constricting the passage, a discharge-mouth, a passage leading from the second chamber to the discharge-mouth, a valve controlling the said passage, said valve being operated by the movement of the diaphragm, and means for moving the diaphragm, substantially as described.

5. A device for measuring fluids comprising a chamber, a movable diaphragm therein, a source of supply, a second chamber adapted to receive the fluid from the source of supply, a passage leading from the said second chamber to the first-mentioned chamber, means for constricting the passage, consisting of a turn-cock, a valve-chest at the end of said passage, a one-way valve therein adapted to close communication between the valve-chest and said first-mentioned chamber, a chamber between the rear face of the diaphragm and the second chamber, an opening between the said chambers, a valve controlling said opening, said valve being operated by the movement of the diaphragm, a discharge-mouth leading from the third chamber and a cock therein for controlling the same, and means for moving the diaphragm, substantially as described.

6. A device for measuring fluids comprising a chamber, a movable diaphragm therein, means for supplying fluid to said chamber comprising a source of supply, a passage connecting the source of supply with the chamber, means for constricting the said passage and a one-way valve in the passage, a discharge-mouth, a passage from the discharge-mouth to the source of supply, a valve for controlling the said passage, said valve being operated by the movement of the diaphragm, and means for moving the said diaphragm consisting of a second diaphragm in the chamber and means for moving the same.

In testimony whereof I have hereunto set my hand in the presence of two subscribing witnesses.

ALFRED WILLIAM SOUTHEY.

Witnesses:
T. A. HEARSON,
WALTER J. SKERTEN.